United States Patent Office 3,248,360
Patented Apr. 26, 1966

3,248,360
NON-SCORCHING CURABLE CARBOXYLIC
POLYMER COMPOSITIONS
Victor L. Hallenbeck, Brecksville, Ohio, assignor to The
B. F. Goodrich Company, New York, N.Y., a corporation of New York
No Drawing. Filed Aug. 10, 1961, Ser. No. 130,499
5 Claims. (Cl. 260—41.5)

This invention relates to non-scorching, heat curable carboxyl containing polymer compositions and more particularly pertains to non-scorching heat curable compositions comprising a major proportion of a polymeric carboxyl containing elastomeric or plastic material and a minor proportion of a phosphate coated polyvalent metal compound and to a method for preparing same.

The curing of carboxyl containing polymers by the condensation of the carboxyl groups with a polyvalent metal oxide is well known in the art. See for instance U.S. Patents 2,649,439; 2,662,874; 2,724,707 and 2,961,348 wherein the polyvalent metal oxide cure of various carboxyl containing plastic and rubbery polymers is disclosed. It is also well known that the salt formation reaction between a polyvalent metallic cation and a carboxyl-containing polymer is rapid and vigorous compared to, for example, sulfur vulcanization of natural and synthetic rubbers, and will occur to some extent when an intimate mixture of the polyvalent metal cation and the carboxyl-containing polymer are allowed to stand at ordinary temperatures. Because of this premature cure or scorching tendency it has been necessary to alter the normal rubber compounding procedure and to intermix the carboxyl containing polymer and the metal oxide rapidly at temperatures preferably below 200° F. and subsequent cure must be carried out without too much delay because of the aforementioned room temperature cure which takes place.

There has been a need for a method for premixing masterbatches of carboxyl containing polymer, polyvalent metal curing agent and other compounding ingredients, reinforcing agents and the like, to give a stock which can be stored for long periods of time at ordinary temperatures and can readily be subsequently heated, softened, melted, calendered, etc. with little or no scorching and cured rapidly at higher temperatures to give products having desirable physical properties. If such non-scorching masterbatches were available it would be possible for rubber manufacturers, for instance, to prepare them in conventional large scale rubber mixers and the masterbatch could then be supplied to the smaller fabricators who would only have to mold and cure the final article. The economic advantages of the foregoing are quite obvious.

It is an object, therefore, to provide a plastic polymer stock comprising a carboxyl containing polymer and a compound having a polyvalent metal ion available for curing which is stable, non-scorching at ordinary temperatures and even elevated temperatures below the cure temperature. Another object is the provision of a novel method for preparing the foregoing stable, non-scorching stocks. Still another object is the provision of a method for preparing the aforementioned compound having a polyvalent metal ion available for curing.

That the foregoing and other objects are accomplished by the present invention will become evident to those skilled in the art from a reading of the following description and examples.

The use of sulfide coated polyvalent metal compounds for the achievement of many of the foregoing objects is fully disclosed and claimed in the copending U.S. patent application of Victor L. Hallenbeck and David Craig, Serial No. 111,439, filed May 22, 1961.

I have discovered a heat curable, non-scorching novel composition comprising a major proportion of a plastic carboxyl containing polymer and a minor proportion of a polyvalent metal phosphate coated polyvalent metal compound.

The plastic carboxyl containing polymers useful in this invention include those resulting from the interpolymerization of one or more carboxylic monomers with one or more other monomers copolymerizable therewith, the polymerization of monomers having groups which are hydrolyzable to carboxyl groups or those resulting from the reaction of a carboxylating agent or carboxyl supplying reagent with a plastic or rubbery polymer which does not contain carboxyl groups.

Carboxylic interpolymers embodied herein are those resulting from the polymerization of a minor amount of carboxyl containing monomer with a major amount of one or more other monomers copolymerizable therewith. The olefinically unsaturated carboxylic acids are preferred as carboxyl containing monomers and the monomers copolymerizable therewith include conjugated dienes, acrylate esters, methacrylate esters, vinyl esters, monoolefins, vinyl cyanides, vinyl aromatic compounds, vinyl halides, vinyl ethers, maleate esters, fumarate esters, and the like.

The olefinically unsaturated carboxylic acids which are interpolymerized to give carboxyl polymers embodied herein are characterized as possessing one or more olefinic carbon-to-carbon double bonds and one or more carboxyl groups, that is, monocarboxy and poly-carboxy, monoolefinic and polyolefinic acids including, for example, such widely divergent materials as acrylic acid, the alpha-alkyl acrylic acids, crotonic acid, beta acryloxy propionic acid, alpha- and beta-vinyl acrylic acid, alpha, beta-diisopropylidene propionic acid, sorbic acid, cinnamic acid, maleic acid, oleic acid, undecylenic acid, ricinoleic acid, linoleic acid, linolenic acid and others. Better results are obtained by utilization of one or more olefinically-unsaturated carboxylic acids containing at least one activated olefinic carbon-to-carbon double bond, that is, an acid containing an olefinic double bond which readily functions in an addition polymerization reaction because of the olefinic double bond being present in the monomer molecule either in the alpha-beta position with respect to a carboxyl group thusly —CH=CH—COOH or attached to a terminal methylene grouping thusly $CH_2=C<$.

Illustrative alpha-beta unsaturated carboxylic acids within the above-described preferred class include maleic acid, fumaric acid, itaconic acid, citraconic acid, mesaconic acid, crotonic acid, alpha-butyl crotonic acid, angelic acid, hydrosorbic acid, cinnamic acid, m-chloro cinnamic acid, p-chloro cinnamic acid, umbellic acid, beta-benzal acrylic acid, and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-, epsilon-dimethyl sorbic acid, alpha-methyl-gamma-benzal crotonic acid, beta-(2-butene)acrylic acid, 2,4-pentadienoic acid, 2,4,6-octatrienoic acid, 2,4,6,8-decatrienoic acid, 1-carboxyl-1-ethyl-4-phenyl butadiene-1,3,2,6-dimethyl decatriene-(2,6,8)-oic-10 acid, alpha, beta-diisopropylidene propionic acid having the structure

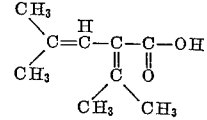

alpha vinyl cinnamic acid, alpha-isopropenyl-furfural acetic acid, alpha-isopropenyl-cinnamyl acrylic acid, and other polyolefinic monocarboxylic acids; hydromuconic acid, glutaconic acid, and other monoolefinic polycarboxylic acids; 3-carboxy-pentadiene-(2,4)-oic-1, muconic acid, and other polyolefinic polycarboxylic acids.

Olefinically unsaturated carboxylic acids containing the $CH_2=C<$ grouping include acrylic acid, alpha-chloro acrylic acid, methacrylic acid, ethacrylic acid, alpha-isopropylidene acrylic acid, alpha-styryl acrylic acid, beta vinyl acrylic acid, alpha-vinyl acrylic acid, beta-acryloxy acetic acid, and others.

Monomers copolymerizable with the foregoing carboxylic monomers which are useful in the interpolymers embodied herein include the open chain, aliphatic conjugated dienes including the butadiene-1,3 hydrocarbons such as butadiene-1,3 itself, 2-methyl butadiene-1,3 (isoprene), 2, 3-dimethyl butadiene-1,3, piperylene, 2-neopentyl butadiene-1,3 and other hydrocarbon homologues of butadiene-1,3 and in addition the substituted dienes such as 2-chloro butadiene-1,3, 2-cyano butadiene-1,3, the straight- and branched-chain conjugated hexadienes and others. The butadiene-1,3 hydrocarbons and butadiene-1,3 in particular, because of their ability to produce stronger and more desirable polymers are much preferred.

Also included as monomers copolymerizable with the foregoing carboxylic monomers in the formation of carboxyl containing plastic and rubbery polymers embodied herein are monoolefinic monomers including acrylate esters such as methyl acrylate, ethyl acrylate, the propyl acrylates, the butyl acrylates, the amyl acrylates, the hexyl acrylates and acrylate esters in general wherein the alcohol moiety is composed of a hydrocarbon group having from 1 to 18 carbon atoms; the methacrylate esters such as methyl methacrylate, ethyl methacrylate, cyclohexyl methacrylate, phenyl methacrylate and methacrylate esters in general wherein the alcohol moiety is composed of a hydrocarbon group having from 1 to 18 carbon atoms; the vinyl halides such as vinyl chloride, vinyl bromide, vinyl fluoride, vinyl iodide, vinylidene chloride, tetrafluoro ethylene, chloro trifluoro ethylene, and the like; the vinyl cyanides such as acrylonitrile, methacrylonitrile, vinylidene cyanide, alpha-cyano ethyl acrylate, maleic nitrile and the like; the vinyl aromatic monomers such as styrene, alpha-methyl styrene, the vinyl toluenes, the vinyl xylenes, vinyl biphenyl, vinyl naphthalene and the like; the allyl esters such as allyl acetate, allyl butyrate, methallyl acetate and the like; the vinyl esters such as vinyl acetate, vinyl propionate, vinyl butyrate, vinyl stearate, vinyl benzoate, isopropenyl acetate, isopropenyl laurate, and the like; the vinyl ethers such as vinyl methyl ether, vinyl ethyl ether, vinyl-2-ethyl hexyl ether and the like; vinyl pyridine, isobutylene, ethylene, propylene and the like; the allyl ethers such as methyl allyl ether, ethyl methallyl ether, and others.

Carboxyl-containing polymers disclosed in U.S. Patents 2,649,439; 2,662,874; 2,724,707 and 2,849,426 are all useful in the instant invention. The polymers containing from 0.001 to 0.30 chemical equivalents of (—COOH) per 100 parts of polymer (e.p.h.p.) are predominantly plastic in nature and are adapted to produce rubbery elastic compositions when condensed with a polyvalent metallic oxide. Polymers containing from 0.02 to 0.20 e.p.h.p. of carboxyl are preferred for the production of elastomeric metallo-carboxylates having the best balance of properties while those containing from 0.02 to 0.10 e.p.h.p. of carboxyl are preferred for the production of strong elastic compositions having most excellent low temperature flexibility.

The phosphate coated polyvalent metal compound is admixed with the carboxyl-containing polymer in any conventional manner such as by mill-mixing, in a Banbury or other type of internal mixer, by mixing an aqueous dispersion of the phosphate coated polyvalent metal compound with a carboxyl-containing polymer latex or dispersion and precipitating the mixed dispersion and the like. Similarly the phosphate coated polyvalent metal compound may be dispersed in a solution of the carboxyl-containing polymer in an organic solvent for said polymer and the mixture may be coagulated or deposited as a film upon evaporation of the solvent. In mixing the polymer and phosphate coated polyvalent metal compound, mastication of the mixture should be continued until the resulting mixture is homogeneous with the phosphate coated polyvalent metal compound well dispersed in the polymer. Conventional softeners, plasticizers, curing agents, melting aids, reinforcement pigments such as carbon black and siliceous materials may be incorporated into the polymer phosphate coated polyvalent metal compound composition embodied herein.

The phosphate coated polyvalent metal compounds which may be utilized in the present invention are the phosphate coated oxides of zinc, magnesium, cadmium, calcium, titanium, aluminum, barium, strontium, copper- (ic), cobalt(ic), tin and others. Specifically included are zinc oxide, calcium oxide, cadmium oxide, magnesium oxide, dibutyl tin oxide, lead oxide, barium oxide, cobalt oxide, tin oxide, strontium oxide, and others. In addition, various phosphate coated polyvalent metallic hydroxides, many of which in reality are hydrated metallic oxides and upon heating with polymer carboxyl groups readily split off water, such as calcium hydroxide, cadmium hydroxide, zinc hydroxide, barium hydroxide and others are utilizable. Similarly, carboxylic acid salts of the aforementioned polyvalent metals when coated with the polyvalent metal phosphate are meant to be included in the compositions of this invention. The phosphate coated polyvalent metal oxides are preferred and zinc phosphate coated oxide is most preferred in this invention.

The proportions of phophate coated polyvalent metallic oxide curing agent required for efficient cure of applicant's compositions will vary, of course, depending upon the particular nature of the curing agent, on the interpolymerized acid content (or —COOH content) of the polymer and on the fineness and compatibility of the phosphate coated metallic oxide with the rubber. Amounts of phosphate coated metallic oxide having metallic oxide equivalent to ½ the carboxyl content of the polymer product curable, non-scorching compositions. For optimum results the amount of curing agent should be at least equivalent chemically to the —COOH content of the polymer. Since excess curing agent does not have an adverse effect on the composition, it is generally preferred to utilize amounts of curing agent in excess of stoichiometrical proportions and preferably twice or more stochiometrical amounts. Generally, however, amounts of the phosphate coated metallic oxide such as zinc phosphate coated zinc oxide varying from 1 to 30% based on the weight of carboxylic polymer will be found sufficient with amounts from 4 to 20% by weight being preferred.

The phosphate coatings useful in the present invention include orthophosphates, polyphosphates, metaphosphates, ultraphosphates, pyrophosphates, polyphosphates, monohydrogen phosphates, dihydrogen phosphates, and others of the types disclosed in Encyclopedia of Chemical Technology, by Kirk and Othmer, Interscience, Encyclopedia, Inc., New York, 1953, pages 403–435.

The phosphate coated polyvalent metallic oxides embodied herein are most conveniently prepared by treating a granular solid polyvalent metallic compound, such as zinc oxide, with a dilute aqueous solution of phosphoric acid until the surface of the zinc oxide is converted to zinc phosphate at room temperature, above or below. The phosphate coating can also be done by treating the zinc oxide with a gaseous phosphoric oxide and steam or humid air without the use of a liquid diluent or in a less preferred manner the zinc oxide may be coated on the surface by exposure to the liquid phosphoric acid. The phosphoric acids which are useful in preparing the phosphate coated metallic oxides embodied herein include orthophosphoric acid, metaphosphoric acid, pyrophosphoric acid and the like and the preferred acid is orthophosphoric acid. Similarly in a less preferred manner the polyvalent metal compound may be coated on its surface by reaction with an organic phosphate compound.

The amount of phosphoric acid or phosphate required for the coating operation will vary depending upon the particle size of the polyvalent metallic oxide. It has been found that a small particle size metallic oxide requires treatment with somewhat greater amounts of phosphoric acid than does a larger particle size metallic oxide. The metallic phosphate coating may only be a fine surface coating for the purposes of the present invention, however, the depth of the surface coat does not appear to be critical. As much as 50% of the original polyvalent metallic oxide may be converted to phosphate without completely retarding the ability of the product to cure a carboxyl-containing polymer.

The exact nature of the phosphate coating present on the surface of the metallic oxide is not certain in every case. To exemplify, a phosphate coated zinc oxide may have on its surface one or more of the following compounds and various hydrates thereof: $Zn_3(PO_4)_2$, $ZnHPO_4$, $Zn(H_2PO_4)_2$, $ZnNH_4PO_4$, $Zn_2P_2O_7$, $ZnH_2P_2O_7$, $$Zn_3(HP_2O_7)_2$$

and the like.

Unless the polyvalent metallic oxide particles are completely coated with a phosphate layer, however, the resulting product is not effective in preventing premature curing or scorching of the carboxyl polymer composition. The ultimate particle size of the phosphate coated polyvalent metal oxides embodied herein is not critical in the present invention. Particles having average diameters of from 0.01 to 10 microns are preferred and those having average diameters of from about 0.1 to 5 are most preferred. It has been found that particulate polyvalent metal oxides having a coating of as little as 0.01% by weight of the polyvalent metal phosphate can be used in carboxylic polymer mixtures which are non-scorching but readily curable at ordinary cure temperatures.

The phosphate coated polyvalent metal oxides embodied in the instant invention are to be distinguished from the fatty acid salt coated polyvalent metal oxides described in U.S. Patent No. 2,303,329 because the latter materials are truly very readily incorporated into rubbers, but they do not prevent scorching when incorporated into carboxyl containing polymers of the type embodied herein.

Because polyvalent metal salts of carboxylic acids are known to be excellent curing agents for carboxylic polymers, it is to be expected that a polyvalent metal oxide coated with a polyvalent metal salt of a carboxylic acid, such as zinc propionate coated zinc oxide, would cause room temperature cure or scorching when it is mixed into a carboxylic polymer. The mechanism whereby the phosphate coated polyvalent metal oxides prevent scorching but do cause cure is not completely understood at present. It is possible that the coating of polyvalent metal phosphate, which is known to have no effect on the cure, protects the reactive polyvalent metal oxide until higher cure temperatures are reached at which point the polyvalent metal oxide becomes available for the cure reaction.

The following examples wherein the amounts of ingredients are given in parts by weight unless otherwise indicated will illustrate the compositions and process of this invention.

*Example I*

A reaction vessel was charged with 81 g. of a dry particulate zinc oxide having an average particle size of about 1 micron and 100 g. of water. This mixture was agitated continuously at 25° C. while 0.72 g. of orthophosphoric acid was slowly added. The resulting slurry was then agitated at 25° C. for a day. The solid product was isolated by filtration, washing the water, and drying. The product was found to contain 2.65% by weight of zinc phosphate which was calculated as $Zn_3(PO_4)_2$ for sake of convenience.

In a similar manner zinc phosphate coated zinc oxides were prepared which contained 3.9%, 5.7%, 7.8%, 11.4% and 26.5% by weight of zinc phosphate.

The foregoing zinc phosphate coated zinc oxide containing 3.9% $Zn_3(PO_4)_2$ was used as a curing agent in a carboxylic rubber recipe as shown in C below. For comparison purposes recipe A employs the conventional uncoated zinc oxide curring agent and recipe B employs finely divided granular zinc phosphate.

| | A | B | C |
|---|---|---|---|
| Rubber interpolymer of 67 butadiene-27 acrylonitrile-6 methacrylic acid having 0.0675 e.p.h.r. of —COOH and a Mooney viscosity of 60 | 100 | 100 | 100 |
| Zinc oxide | 5 | | |
| Zinc phosphate | | 5 | |
| Zinc phosphate coated zinc oxide | | | 5 |
| Carbon black (FEF) | 40 | 40 | 40 |

Each of the above mixtures was prepared on a rubber mill and the Mooney viscosity (ML 212° F.) was determined for each stock just after mixing and again after standing at room temperature for 30 days.

| | A | B | C |
|---|---|---|---|
| Mooney viscosity, 4 min | 93 | 81 | 92 |
| Mooney viscosity, after 30 days | 107 | 80 | 92 |

Mooney scorch was determined for each sample at 250° F. and at 310° F. (the latter is normal cure temperature).

| | A | B | C |
|---|---|---|---|
| Mooney scorch (250° F.), min | 6 | (¹) | 36 |
| Mooney scorch (310° F.), min | 2 | (¹) | 2 |

¹ No cure.

Milled stocks of each of the foregoing recipes were cured at 310° F. for 30 minutes. The resulting vulcanizates had the following physical properties.

| | A | B | C |
|---|---|---|---|
| Compression set (70 hrs.): | | | |
| 212° F.,⁵ percent | 98 | (¹) | 98 |
| NBS Abrasion index | 5 | (¹) | 10 |
| Stress-strain-room temp.: | | | |
| Tensile, p.s.i | 4,280 | (¹) | 4,380 |
| 300% Modulus, p.s.i | 2,950 | (¹) | 3,100 |
| Elongation, percent | 450 | (¹) | 425 |

¹ No cure.

It is apparent that zinc phosphate does not function as a curing agent (see properties of vulcanizate B). It is also evident that the zinc phosphate coated zinc oxide curing agent prevents scorching but that cured stocks employing it are practically indistinguishable over those employing conventional ZnO at the conventional cure temperature.

Each of the aforementioned zinc phosphate coated zinc oxides containing varying amounts of zinc phosphate were employed in a recipe similar to recipe C above. The mixed stocks were subjected to Mooney scorch test. In each case 36 minutes were required for cure at 250° F. and cure was achieved in about 1 minute at 310° F.

Similar results were obtained when a rubbery copolymer of 92 butadiene-8 methacrylic acid having 0.105 e.p.h.r. of —COOH and a Mooney viscosity of 55 was substituted for the butadiene-acrylonitrile-methacrylic acid interpolymer alone.

*Example II*

The procedures given in Example I were followed. In the following recipes the zinc phosphate coated zinc oxide employed contained 3.9% by weight of zinc phosphate.

|                                          | A   | B   |
|------------------------------------------|-----|-----|
| Rubbery interpolymer of Example I        | 100 | 100 |
| Stearic acid                             | 100 | 100 |
| Zinc oxide                               | 5   |     |
| Zinc phosphate coated zinc oxide         |     | 5   |
| Carbon black (FEF)                       | 40  | 40  |
| Tetramethylthiuram disulfide             | 3.5 | 3.5 |

The stocks were mixed in a Banbury and the resulting stocks had the following properties.

|                                  | A    | B  |
|----------------------------------|------|----|
| Mooney viscosity, 4 min          | 90   | 88 |
| Mooney viscosity, after 30 days  | (¹)  | 88 |
| Mooney scorch (250° F.), min     | 2½   | 15 |
| Mooney scorch (310° F.), min     | ½    | 2  |

¹ Too tough.

Sample of stocks A and B were cured at 310° F. for 30 minutes. The resulting vulcanizates had the following properties:

|                                    | A     | B     |
|------------------------------------|-------|-------|
| Compression set (70 hrs.):         |       |       |
|   212° F., percent       | 47.3  | 42.5  |
| NBS Abrasion index                 | 8.2   | 2     |
| Stress-strain-room temperature:    |       |       |
|   Tensile, p.s.i         | 4,600 | 4,650 |
|   300% Modulus, p.s.i    | 3,250 | 3,150 |
|   Elongation, percent    | 450   | 450   |

In the foregoing manner the other zinc phosphate coated zinc oxides described in Example I were used in recipe B with the following results:

| Percent by weight of zinc phosphate in the coated ZnO | Mooney scorch (min.) | |
|---|---|---|
| | 250° F. | 310° F. |
| 2.65  | 16 | 2.5 |
| 5.79  | 15 | 2   |
| 7.8   | 16 | 3   |
| 11.4  | 16 | 2.5 |
| 26.5  | 16 | 4   |

Similar results were obtained when a rubbery copolymer of 92 butadiene-8 methacrylic acid was substituted for the butadiene-acrylonitrile-methacrylic acid interpolymer alone.

I claim:
1. A plastic rubbery composition curable to the elastic rubbery condition by heating to curing temperatures of the order of about 310° F. and having the ability to be stored and processed at normal temperatures without premature curing, said composition comprising a plastic rubbery polymer of a butadiene-1,3 hydrocarbon containing from 0.001 to 0.30 chemical equivalents of carboxyl groups per 100 parts of polymer in which there is admixed, as curing agent therefor, from 1 to 30% by weight based on said polymer of particles consisting essentially of a base of polyvalent metal compound selected from the class consisting of polyvalent metal oxides, hydrated oxides and carboxylic acid salts, completely coated with from 0.01 to 50% by weight of a phosphate of the same polyvalent metal.

2. A plastic rubbery composition curable to the elastic rubbery condition by heating to curing temperatures of the order of about 310° F. and having the ability to be stored and processed at normal temperatures without premature curing, said composition comprising a plastic rubbery interpolymer of butadiene-1,3 and an alpha-beta unsaturated carboxylic acid containing the $CH_2=C<$ group, said interpolymer containing from 0.01 to 0.20 chemical equivalents of carboxyl groups derived from said acid per 100 parts of polymer, in which there is admixed, as curing agent therefor, from 4 to 20% by weight based on said polymer of particles, of average diameter of 0.01 to 10 microns, consisting essentially of zinc oxide and zinc phosphate, the zinc phosphate content being about 2 to about 25% by weight and the zinc oxide therein being completely coated by the zinc phosphate.

3. A plastic rubbery composition in accordance with claim 2 in which the plastic rubbery interpolymer is a three-component interpolymer of about 67 parts of butadiene-1,3, about 27 parts of acrylonitrile and about 6 parts of methacrylic acid.

4. A plastic rubbery composition in accordance with claim 2 in which the plastic rubbery interpolymer is a two-component interpolymer of about 92 parts of butadiene-1,3 and about 8 parts of methacrylic acid.

5. In the method of producing a cured elastic rubbery polymer of a butadiene-1,3 hydrocarbon containing from 0.001 to 0.3 chemical equivalents of combined carboxyl groups per 100 parts of polymer by the steps of mixing said polymer in the uncured plastic condition with particulate zinc oxide in an amount from ½ to 2 times that which is chemically equivalent to the carboxyl content of said polymer and then heating the resulting composition to curing temperature of the order of about 310° F., the improvement which consists in utilizing a particulate zinc oxide in which the zinc oxide particles are completely coated with zinc phosphate, thereby to prevent premature curing of said polymer during storage and processing prior to said heating step without substantially affecting the properties of said cured elastic rubbery polymer.

References Cited by the Examiner

UNITED STATES PATENTS 2,727,012  12/1955  Treat et al. _____ 260—41
2,849,426  8/1958   Miller _____ 260—41.5

FOREIGN PATENTS 583,471  12/1946  Great Britain.

OTHER REFERENCES

Morton: "Introduction to Rubber Technology," Reinhold Pub. Corp., N.Y., 1959, pp. 221–223.

MORRIS LIEBMAN, *Primary Examiner.*

LEON J. BERCOVITZ, ALEXANDER H. BRODMERKEL, *Examiners.*